United States Patent [19]

Maxel

[11] 4,009,225
[45] Feb. 22, 1977

[54] LOW PROFILE PIGMENTED SHEET MOLDING PROCESS AND PRODUCT

[75] Inventor: John M. Maxel, St. Charles, Ill.

[73] Assignee: Armco Steel Corporation, Middletown, Ohio

[22] Filed: July 10, 1975

[21] Appl. No.: 594,651

Related U.S. Application Data

[63] Continuation of Ser. No. 403,935, Oct. 5, 1973, abandoned.

[52] U.S. Cl. .......................... 260/862; 260/40 R; 264/160; 264/216; 264/245; 264/331; 264/349
[51] Int. Cl.$^2$ ................. B29C 1/04; C08F 43/08
[58] Field of Search .......... 264/212, 216, 331, 349, 264/160, 245; 260/862, 40 R; 156/179

[56] References Cited

UNITED STATES PATENTS

| 3,665,055 | 5/1972 | Hatton, Jr. et al. | 260/862 |
| 3,701,748 | 10/1972 | Kroekel | 264/331 |
| 3,716,431 | 2/1973 | Townsend et al. | 156/179 |
| 3,801,693 | 4/1974 | Stallings et al. | 264/331 |
| 3,830,875 | 8/1974 | Meincke et al. | 260/862 |
| 3,864,427 | 2/1975 | Nakane et al. | 260/862 |
| 3,880,950 | 4/1975 | Hara et al. | 260/862 |

*Primary Examiner*—Jeffery R. Thurlow
*Attorney, Agent, or Firm*—Johnston, Keil, Thompson & Shurtleff

[57] ABSTRACT

A low profile pigmented sheet molding process and product are provided which will produce molded parts with uniform gloss and color even in three-dimensional articles having steep and deep walls.

8 Claims, No Drawings

LOW PROFILE PIGMENTED SHEET MOLDING PROCESS AND PRODUCT

This a continuation, of application Ser. No. 403,935, filed Oct. 5, 1973, now abandoned.

BACKGROUND

Various sheet molding processes are well known in the art wherein a sheet of material to be molded containing resin components and reinforcing fibers is molded between heated dies. Thermosetting resins normally tend to shrink when molded and it has been customary heretofore to combine such resins with thermoplastic additives. Typically these resin systems have been used for making articles which are subsequently painted. Attempts to internally pigment the sheet to be molded have not been entirely successful because a mottled or washed-out color is obtained at the surface.

In some instances, using recommended procedures where a pigment is incorporated in the molding sheet, the molded parts have good appearances in the flat surfaces but in vertical walls the surfaces are dull, possibly streaked, and essentially poor in appearance in comparison with the horizontal surfaces.

OBJECTS

One of the objects of the present invention is to provide a new and improved process of preparing a low profile pigmented sheet molding which produces a uniform, high gloss appearance on steep and deep walls of 3-dimensional molded articles as well as on the flat surfaces.

Another object of the invention is to provide new and improved molding products resulting from the practice of the above identified process.

A further object of the invention is to provide new and improved sheet molding compositions of the low profile type containing internal pigmentation. Other objects will appear hereinafter.

BRIEF SUMMARY OF THE INVENTION

In accordance with the invention a process of preparing a low profile pigmented sheet molding is provided which comprises preparing a mixture of an unsaturated cross linkable polyester of a dicarboxy acid and a dihydric alcohol, a high temperature inhibitor, a chemically inert powdered filler, a thermoplastic polymer, a cross linking monomer capable of cross linking with said polyester to produce a thermosetting resin, a catalyst for the cross linking reaction, a mold release compound and a pigment. The various components can be added in the order named or in a different order. For example, the thermoplastic polymer can be mixed with the polyester followed by the filler or these three components can be added simultaneously. A thickening reactant is added to the aforesaid mixture, and the resultant mixture is stirred until thickening occurs but the mixture is still pourable. This latter mixture is formed into a thick layer on a strippable carrier sheet, cut bundles of glass filaments are added to the top of said layer, a second strippable carrier is superimposed over the top of said layer, and said layer is kneaded between said strippable sheets to cause said cut bundles of glass filaments to be distributed uniformly in the interior of said layer.

The sheet molding compound is aged at 90° F. (could be 60°–120° F.) for 2 to 3 days (could be 1 to 14 days) until the viscosity of the compound paste reaches a viscosity of 30 $-50\times10^6$ cps (could be 2 to $100\times10^6$ cps). The sheet molding compound is now ready for molding.

The molding process may be carried out by stripping said strippable sheets from said layer, cutting said layer into segments of a size suitable for molding a predetermined article, placing said segments in a mold between solid smooth heated male and female dies, and molding said article between said dies at temperatures sufficiently high to cause linking to occur between said polyester and said cross linking monomer.

DETAILED DESCRIPTION OF THE INVENTION

In the foregoing process the polyester preferably contains one or more dicarboxy acids such as, for example, maleic, fumaric, isophthalic and/or phthalic, or an anhydride of such acids where available in the anhydride form which is reacted with a dihydric alcohol in which the hydroxyl groups are connected by ethylene, diethylene, propylene, dipropylene, trimethylene, neopentyl, or saturated or unsaturated homologues thereof.

The high temperature inhibitor is preferably parabenzoquinone but can be another inhibitor of a similar type (quinone or hydroquinone) which functions in a similar manner to inhibit cross linking of the polyester at temperatures below its melting temperature. If a commercial polyester is used it may contain some cross linking inhibitor but for the purpose of the present invention it is desirable to add an excess over the amount usually present. The inhibitor can be added at any time before the thickening reactant is added.

The chemically inert powdered filler is preferably calcium carbonate having an average particle size of about 2 microns with a maximum of about 30 microns. Other chemically inert powdered fillers, (e.g., clays, hydrated alumina, talc and the like), might be used but calcium carbonate is the most practical and currently the least expensive.

The thermoplastic polymer is preferably polystyrene of a medium impact grade having an Izod rating within the range of about 6 to 10. This type of polymer can contain butadiene usually in amounts not exceeding 15% copolymerized with a portion of the styrene. The thermoplastic polymer is preblended with a cross linking monomer, preferably styrene, which is capable of cross linking with the polyester used in step (a) to produce a thermosetting resin. The preferred weight ratio of polystyrene polymer to styrene monomer is 40:60. The ratio could be 30:70 and in some cases 50:50 but the amount added to the formulation would usually vary. The amount of polystyrene polymer in the total resin portion is an important factor and would usually range from 10 to 20%.

The catalyst is preferably tertiary butyl perbenzoate but other peroxide type catalysts can be used.

The mold release compound is preferably zinc stearate but other similar types of mold release compounds such as, for example, calcium stearate, can be employed.

The pigment can be an inorganic pigment or an organic pigment or a mixture of an inorganic and an organic pigment. Examples of suitable inorganic pigments are Molybdenum Orange and Cadmium Red. Other suitable pigments are carbon black, titanium dioxide, phthalocyanine blue, and other light stable chemically inert organic pigments. The pigment is preferably added in the process in the form of a dispersion in a low molecular weight liquid polyester.

The thickening reactant is preferably magnesium oxide. Other thickening reactants that can be employed are, for example, the oxides and hydroxides of calcium, magnesium, strontium and barium which are in Class II(a) of the Periodic Table of Elements. Magnesium oxide is preferred because it apparently has just the right properties to bring about the desired thickening reaction in a suitable period of time. This thickening reaction is believed to involve a cross linking between the metal of the thickening reactant and carboxy and-/or hydroxy groups attached to linear chains of the polyester.

It appears to be quite important from the standpoint of obtaining molded articles having high gloss on both flat and vertical walls to have a relatively high weight ratio of filler to total resin components which ratio for optimum results should be within the range of about 1.4:1 to about 1.8:1. This ratio is based on the use of calcium carbonate having an oil absorption of 10 and an average particle size of 2 microns. Other fillers with different absorbency will have a different ratio. The amount of filler used should be sufficient to prevent the polymer solution from separating and floating on top (like cream on milk) in the compound paste.

The resultant mixture obtained by stirring or agitating all of the components until thickening has occurred usually has a Brookfield viscosity within the range of 15,000 to 150,000, preferably 50,000 to 100,000 centipoises at 77° F., and is therefore quite thick but is still pourable so that it can be poured onto the strippable carrier sheet and converted into a thick layer usually around ⅛ to 3/16 inch in thickness by passing the carrier sheet containing said mixture beneath a doctor blade, the lower end of which is spaced from the carrier sheet a distance corresponding to the desired thickness of the layer. The doctor blade forms a dam beneath which the mixture passes. Thereafter the cut bundles of glass filaments which are usually about 1 inch in average length are added to the top of the layer. A second strippable carrier sheet is then applied over the continuously moving layer containing the cut bundles of glass filaments and the resultant sandwich is kneaded between alternately spaced rollers so as to cause the cut bundles of glass filaments to be distributed uniformly in the interior of the layer.

The strippable sheet used in the foregoing process is usually a polyolefine film, for example, polyethylene or polypropylene, but can be any type of sheet having a surface from which the pigmented sheet can be separated.

It should be noted that the amount of catalyst is usually within the range of 1.5 to 2% of the total resin forming components and this amount is higher than that customarily recommended for catalysts of this type when employed with resin-forming components of the type described. The amount can vary with different catalysts and an overall range would be 0.5 to 4.0%.

The amount of a catalyst having the activity of tertiary butyl perbenzoate conventionally employed in making SMC compositions using combinations of thermoplastic resins and polyester resins as herein described is not more than 1%. The conventional amount of an inhibitor having the activity of para-benzoquinone which is incorporated in a composition containing 0.75 to 1% tertiary/butyl perbenzoate catalyst is about 175 ppm.

The amount of inhibitor can be 50 to 1000 parts per million (ppm) depending on the kind and amount of catalyst but is usually within the range of 100 to 700 ppm, preferably about 300 ppm based on the weight of the total resin-forming solution (e.g., polyester and polystyrene solution). This amount seems to be sufficient to hold back the cross linking reaction until the pigmented sheet fills the mold and at that point the catalyst overcomes the effect of the inhibitor during the molding step. It is believed that the effect in the mold is to delay the polymerization reaction with the excess inhibitor allowing the material to flow and to fill the mold before the reaction starts. A higher mold temperature influences the polystyrene portion possibly drawing it to the surface in a more uniform manner, resulting in a uniform glossy surface.

Optimum results are obtained by using temperatures within the range of 315° to 325° F. which temperatures are higher than those customarily employed in a molding process of this type. Other temperatures could be used depending on the catalyst and inhibitor used.

The pressures used in the molding process are also a factor and normally should be within the range of 700 to 1500 psig.

The invention will be further illustrated but is not limited by the following examples in which the quantities are by weight unless otherwise indicated.

EXAMPLE I

The process was carried out in the manner previously described using the following ingredients:

| Ingredients | Parts by Weight |
| --- | --- |
| Unsaturated cross linkable polyester (Freeman Chemical 40-2974) | 16.5 |
| Parabenzoquinone (inhibitor) | 0.00825 |
| Calcium carbonate (Camelwite) | 38.675 |
| Pre-Blend of polystyrene (Amoco M-9) | 6.600 |
| and styrene monomer | 4.400 |
| Tertiary butyl perbenzoate (catalyst) | 0.413 |
| Zinc stearate (mold release) | 1.000 |
| Red pigment disperson (Plasticolor CM 7113) | 2.000 |
| Magnesium oxide (Michigan Chemical 15) | 0.412 |
| Cut bundles of glass fibers in 1" lengths (Owens-Corning Fiberglas 495) | 30.000 |
| | 100.00825 |

The ingredients were added in the order listed and the mixing procedure was carried out in the manner previously outlined.

A molding operation using a pigmented sheet approximately ⅛ to 3/16 inch thick formed from the foregoing composition and molded at a temperature of 320° F. resulted in the production of molded articles having uniform high gloss appearance even on vertical walls of molded parts.

EXAMPLE II

The procedure was the same as in Example I except that the following proportions of the ingredients were employed:

| Ingredients | Parts by Weight |
| --- | --- |
| Unsaturated cross linkable polyester (Freeman Chemical 40-2974) | 14.5 |
| Parabenzoquinone (inhibitor)* | 0.121 |
| Calcium carbonate (Camelwite) | 41.0 |
| Pre-blend of polystyrene (Amoco M-9) | 3.88 |
| and styrene monomer | 5.82 |
| Tertiary butyl perbenzoate (catalyst) | 0.363 |

-continued

| Ingredients | Parts by Weight |
| --- | --- |
| Zinc stearate (mold release) | 1.0 |
| Orange pigment dispersion (Plasticolor CM6113) | 3.0 |
| Magnesium oxide solution (Modified M) | 0.327 |
| Cut bundles of glass fibers in 1" lengths (Owens-Corning Fiberglass 433) | 30.0 |

*dissolved in styrene prior to addition

Specific examples of polyester resins which can be used are:

EXAMPLE A

A polyester synthesized from the following ingredients in the proportions given:

| Ingredients | Mole Ratio |
| --- | --- |
| Maleic anhydride | 3.0 |
| Propylene glycol | 3.0 |
| Dipropylene glycol | 1.2 |
| Isophthalic acid (IPA-85) | 1.0 |

The polyester is synthesized by a two stage esterification reaction to an acid number of 30–35 and then dissolved into styrene monomer at a concentration of 65–70% solids. Instead of styrene other monomeric liquids which copolymerize with an unsaturated polyester can be used, e.g., vinyl toluene, acrylic monomers, diallyl phthalate and chlorostyrene.

EXAMPLE B

A polyester synthesized from the following ingredients in the proportions given:

| Ingredients | Mole Ratio |
| --- | --- |
| Maleic anhydride | 1.0 |
| Propylene glycol | 1.1 |

This polyester is synthesized to an acid number of 45–55 and then dissolved into styrene monomer at a 60–70% solids concentration.

The glycol used in making the polyesters of Examples A and B can be varied, e.g., propylene glycol, dipropylene glycol, diethyllene glycol, neopentyl glycol, trimethylene glycol and pentane diol but the proportions employed should be such as to develop a highly exothermic reaction during polymerization.

It will be understood that the invention is subject to some variation in the manner of its practical application particularly with regard to choice of pigments where titanium dioxide would ordinarily be used as a white pigment. Carbon black would ordinarily be used as a black pigment and various inorganic and/or organic pigments would ordinarily be used to supply other types of colors. While tertiary butyl perbenzoate is the preferred catalyst, other types of organic peroxides which are soluble in the hydrophobe or resin phase can be employed, e.g., benzoyl peroxide, acetyl benzoyl peroxide, cumene hydroperoxide, and other oil soluble oxygen supplying catalysts.

While styrene is the preferred cross linking monomer, other monomeric aryl compounds having an unsaturated side chain can be employed, e.g., vinyl toluene, vinyl ethylbenzene, alpha methylstyrene, vinylchlorobenzenes, vinyl xylenes, and diallylphthalate.

Thermoplastic polymers useful in the present compositions include, for example, polystyrene, copolymers of styrene and lower alkyl esters of acrylic and methacrylic acids, and copolymers of styrene with minor amounts of one or more of the following: lauroyl methacrylate, isobornyl methacrylate, acrylamide, hydroxyethylmethacrylate, 2-ethylhexyl acrylate, acrylonitrile, methacrylic acid, methacrylamide, methylol acrylamide, and cetyl stearyl methacrylate. Other useful examples of the thermoplastic polymer are vinyl chloride/vinyl acetate copolymers, and caprolactone polymers.

The unsaturated cross linkable polyester should have high activity in a range corresponding to that between the polyesters of Examples A and B.

Numerous factors contribute to the desired final result, i.e., pigmented gloss on vertical walls. These factors include the type of polyester, the type of thermoplastic resin, the amount of filler, the higher quantity of catalyst, the use of sufficient cross linking reaction inhibitor to delay cross linking until the sheet fills the mold before the cross linking reaction starts, and the use of higher molding temperatures than usually employed in the art.

The term "low profile" as employed herein is one which is well understood in the art and customarily refers to a surface which is so uniform that the variations in depth do not exceed about 150 micron inch.

The invention is useful in making many different types of molded products including various types of housings and component parts for lawnmowers, automobiles, appliances, furniture, bathroom fixtures, hardware and components for the construction industry.

The invention is hereby claimed as follows:

1. A process of preparing a low profile uniformly pigmented sheet molding which comprises preparing a mixture of an unsaturated cross linkable polyester of a dicarboxy acid and a dihydric alcohol, a chemically inert powdered filler, a thermoplastic polymer, a cross linking monomer capable of cross linking with said polyester to produce a thermosetting resin, a tertiary butyl perbenzoate catalyst for the cross linking reaction, a para-benzoquinone high temperature inhibitor for the cross linking reaction, a mold release compound and a pigment, the amount of filler being sufficient to prevent phase separation of the polymer, thereafter adding a thickening reactant to said mixture, stirring the resultant mixture until thickening occurs but said mixture is still pourable, forming said mixture into a thick layer on a strippable carrier sheet, adding cut bundles of glass filaments to the top of said layer, superimposing a second strippable carrier sheet over the top of said layer, and kneading said layer between said strippable sheets to cause said cut bundles of glass filaments to be distributed uniformly in the interior of said layer, stripping said strippable sheets from said layer, cutting said layer into segments of a size suitable for molding a predetermined article, placing said segments in a mold between solid smooth heated male and female dies which are three-dimensional, and molding said article between said dies at temperatures sufficiently high to cause cross linking to occur between said polyester and said cross linking monomer, the amount of said catalyst being substantially larger than conventionally used for catalyzing said cross linking reaction and being at least about 1.5% by weight of the total resin-forming components and the amount of said inhibitor being at least 300 parts per million by weight of the total resin-forming components and being sufficient to hold back the cross linking reaction until the pigmented sheet, after removal of said strippable sheets, is placed in a mold and allowed to fill the mold.

2. A process as claimed in claim 1 in which the thickening agent is magnesium oxide, the ratio of filler to total resin components is within the range of about 1.4:1 to about 1.8:1, the quantity of catalyst is within the range of about 1.5 to about 2% by weight of the total resin components and the quantity of inhibitor is within the range of 300 parts per million to 700 parts per million.

3. A process as claimed in claim 1 wherein the quantity of catalyst is within the range of about 1.5 to about 2% by weight of the total resin components.

4. A process as claimed in claim 1 in which the molding temperatures are within the range of 315° to 325° F.

5. A process as claimed in claim 1 in which the molded article has sidewalls which are deep and steep.

6. A process as claimed in claim 1 in which the molding pressure is 700 to 1500 psig.

7. A product resulting from the process of claim 1.

8. A product resulting from the process of claim 2.

* * * * *

UNITED STATES PATENT AND TRADEMARK OFFICE
CERTIFICATE OF CORRECTION

PATENT NO. : 4,009,225
DATED : February 22, 1977
INVENTOR(S) : JOHN M. MAXEL

It is certified that error appears in the above-identified patent and that said Letters Patent are hereby corrected as shown below:

Column 2, line 10, before "linking" insert --cross--.

Signed and Sealed this

Twenty-fourth Day of May 1977

[SEAL]

Attest:

RUTH C. MASON
*Attesting Officer*

C. MARSHALL DANN
*Commissioner of Patents and Trademarks*